(No Model.)

J. DAWSON.
PRAIRIE FIRE EXTINGUISHER.

No. 542,754. Patented July 16, 1895.

Witnesses  By his Attorneys.  Inventor  James Dawson,

UNITED STATES PATENT OFFICE.

JAMES DAWSON, OF BROADLAND, SOUTH DAKOTA.

PRAIRIE-FIRE EXTINGUISHER.

SPECIFICATION forming part of Letters Patent No. 542,754, dated July 16, 1895.

Application filed January 31, 1894. Serial No. 498,632. (No model.)

*To all whom it may concern:*

Be it known that I, JAMES DAWSON, a citizen of the United States, residing at Broadland, in the county of Beadle and State of South Dakota, have invented a new and useful Prairie-Fire Extinguisher, of which the following is a specification.

My invention relates to a machine for extinguishing prairie fires; and it has for its object to provide a simple, inexpensive, and efficient device adapted to be operated by one man and provided with means for crushing down and smothering the flame without serious inconvenience to the operator and without risk of destroying the apparatus.

Further objects and advantages of this invention will appear in the following description, and the novel features thereof will be particularly pointed out in the appended claims.

Figure 1:
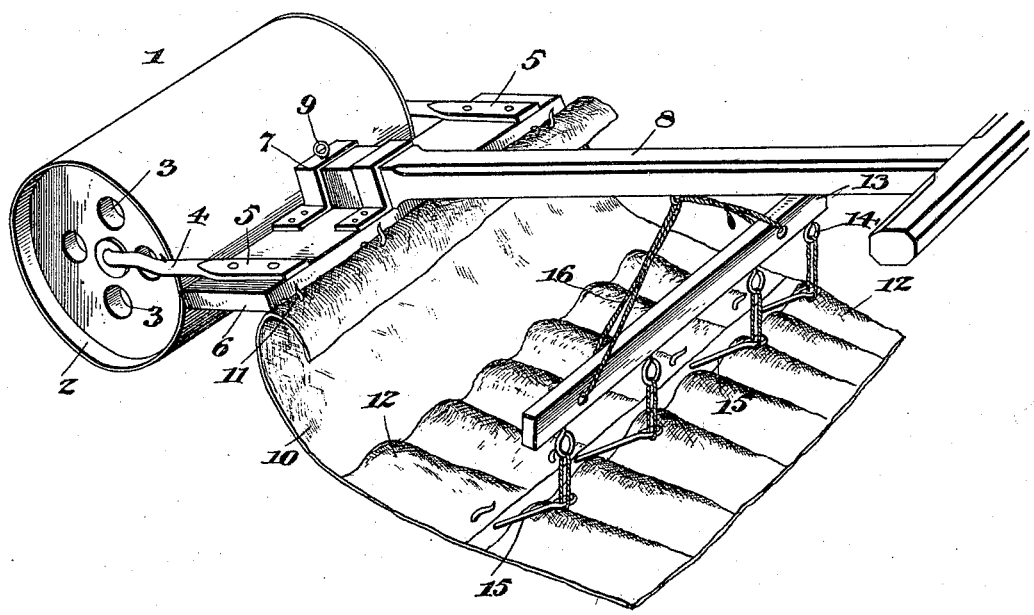
Figure 2:
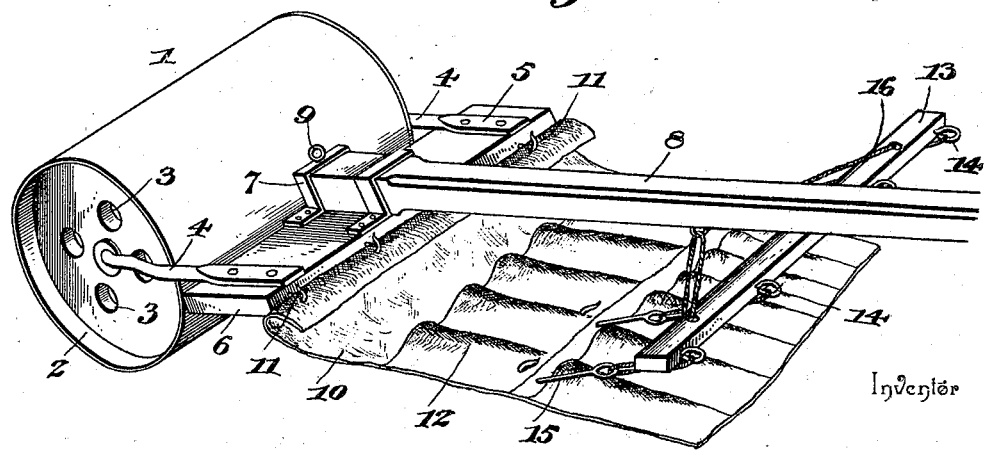

In the drawings, Figure 1 is a perspective view of an apparatus embodying my invention. Fig. 2 is a similar view showing the apron elevated, as seen when it is required to move the machine backward.

Similar numerals of reference indicate corresponding parts in both figures of the drawings.

1 represents a hollow roller provided at one end with a depression or basin 2, formed by setting the head back from the end of the roller, said head being provided near its center with a series of perforations 3 for the introduction of cold water to reduce the temperature of the roller.

4 represents the yoke upon which the roller is fulcrumed, the parallel arms 5 of said yoke being secured at their free ends to the cross-bar 6, having keepers 7 for the reception of the end of the tongue 8. The tongue is detachable from said keepers and is secured in place by means of a pin 9, engaging registering perforations in the tongue and one of the keepers.

10 represents a smothering-apron of flexible material, which is engaged at one end upon the hooks 11 at the rear edge of the cross-bar. This apron is provided with a series of spaced pockets 12 for the reception of earth or other heavy material to keep the apron in contact with the surface of the ground. Suspended from the tongue near the rear end or handle-portion thereof is a bar 13, provided with eyes 14, to which are connected hooks 15, which are engaged with the apron near its rear or free end. The bar 13 is connected to the handle by means of a cord or chain 16, and when it is desired to move the machine backward this bar, which occupies an intermediate position between the tongue and the apron, may be drawn back by hand, as shown in Fig. 2, to elevate the free end of the apron.

In operation the machine is moved forward, so that the roller will pass first over the flame in order to beat the grass down, whereby the following apron may pass thereover and smother the fire. The roller is preferably made light in weight, and being provided interiorly with water it is maintained at a comparatively low temperature.

The apron should be moistened while in use and should be weighted sufficiently to bear firmly upon the surface of the ground.

It will be understood that in order to introduce water into the interior of the roller the latter is placed on end, with the depressed portion or basin 2 uppermost, the water being poured into said depression or basin. From this depression or basin the water finds its way through the perforations 3 into the roller, and it is clear that inasmuch as said perforations are arranged contiguous to the center of rotation of the axis of the roller the water will not escape when the roller is arranged in its horizontal or operative position unless the interior has been filled sufficiently to cause the level of the water to rise above the lowermost perforations. In any case a quantity of water will be retained in the bottom or lower portion of the roller, and will thus serve to prevent the rapid heating of the roller.

Various changes in the form, proportion, and the minor details of construction may be resorted to without departing from the principle or sacrificing any of the advantages of this invention.

Having described my invention, what I claim is—

1. In a prairie-fire extinguisher, the combination of a roller provided with a tongue, and a flexible apron arranged to drag in rear of said roller and provided with pockets for the reception of sand or other material to weight the apron, substantially as specified.

2. In a prairie-fire extinguisher, the combination of a framework, a roller journaled upon said framework, a tongue connected to the framework, a flexible apron secured at its front edge to the cross-bar of the framework, and an intermediate bar suspended flexibly from the tongue and connected to the apron near its rear free edge, substantially as specified.

3. In a prairie-fire extinguisher, the combination of a framework having a cross-bar provided at its rear edge with hooks, a roller journaled upon said framework, a tongue detachably connected to the cross-bar, a weighted apron detachably connected at its front edge to said hooks upon the cross-bar, a bar suspended loosely from the tongue near its free end, and hooks forming a detachable connection between said loosely-suspended bar and the apron, substantially as specified.

In testimony that I claim the foregoing as my own I have hereto affixed my signature in the presence of three witnesses.

JAMES DAWSON.

Witnesses:
 WILLIAM HARRIS,
 A. W. PAGE,
 J. J. WILSON.